F. J. KITOWSKI.
AUXILIARY SPRING FOR VEHICLES.
APPLICATION FILED MAY 2, 1914.

1,159,232.

Patented Nov. 2, 1915.

WITNESSES

INVENTOR
FERDINAND J. KITOWSKI,
BY Munn & Co
ATTORNEYS

UNITED STATES PATENT OFFICE.

FERDINAND J. KITOWSKI, OF ST. CLOUD, MINNESOTA.

AUXILIARY SPRING FOR VEHICLES.

1,159,232.  Specification of Letters Patent.  Patented Nov. 2, 1915.

Application filed May 2, 1914. Serial No. 835,923.

*To all whom it may concern:*

Be it known that I, FERDINAND J. KITOWSKI, a citizen of the United States, and a resident of St. Cloud, in the county of Stearns and State of Minnesota, have invented a new and Improved Auxiliary Spring for Vehicles, of which the following is a full, clear, and exact description.

The invention relates to auxiliary resilient suspension means for vehicles.

An object thereof is to provide a simple, strong, efficient and inexpensive auxiliary suspension means which forms a protector for the main spring used in connection with vehicles and which will also serve as a shock absorber.

Another object of the invention is to provide an auxiliary spring which will properly support the vehicle if the main spring associated therewith breaks.

I attain these objects by the structure illustrated in the accompanying drawings forming part of the specification, in which similar characters of reference indicate corresponding parts in all the views and wherein—

Figure 1:
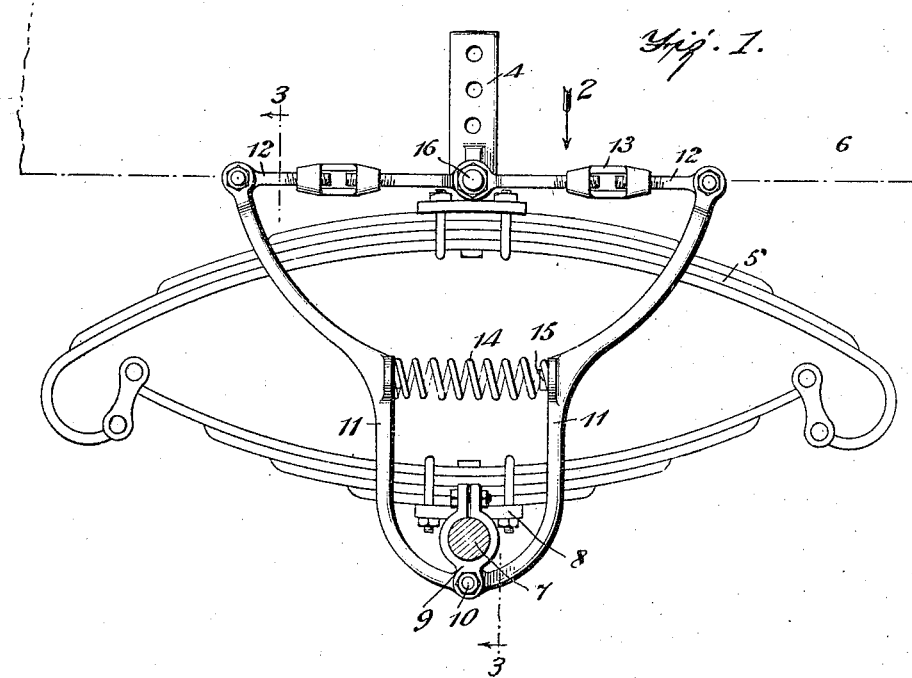
Figure 2:
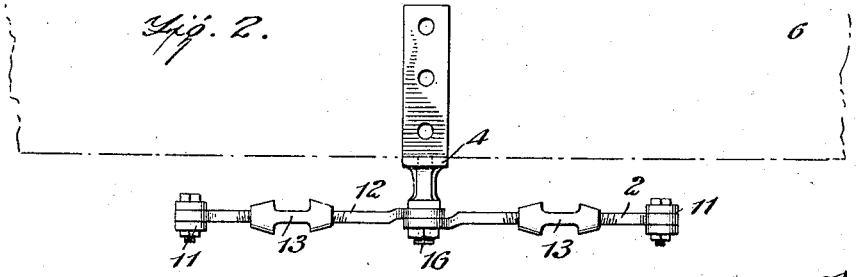
Figure 3:
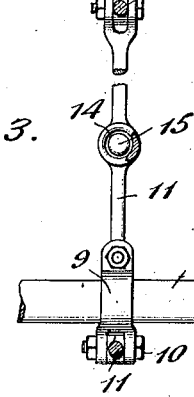

Figure 1 is an elevation of a vehicle spring provided with an auxiliary suspension embodying my invention; Fig. 2 is a plan view in the direction of the arrow 2 in Fig. 1; Fig. 3 is a section on line 3—3, Fig. 1; and Fig. 4 is a modified structure of the connection between the arms and the spring.

Referring to the drawings, 4 represents a bracket which connects the main spring 5 to the vehicle body 6 which is shown in broken outline in Figs. 1 and 2. The main spring 5 is supported in the usual way by the axle 7 of the vehicle. Clamped to the axle 7 adjacent the yoke 8 which connects the main spring to the axle is a bracket 9. The bracket 9 below the axle is provided with a bolt 10 forming a pivot for two oppositely disposed arms 11 extending from said pivot above the main spring 5. The lower half of each of said arms rises from the pivot 10 substantially parallel to the plane passing through the bracket 4 and axle 7. The upper half of each of the arms diverges away from said plane; and the upper end of each of said arms 11 is connected to the bracket 4 by means of links 12. The length of each link may be varied by means of turn-buckles 13 provided in the links. The links 12 form a pivotal connection between the arms 11 and the bracket 4. A coil-spring 14 is provided between the arms 11 at the upper part of their lower half, where each of the arms is provided with a projection 15 engaged by the spring. The compression of the spring may be varied by means of the turn-buckles 13. When the bracket 4 moves toward the axle 7 the pivot 16 engaged by the links 12 will move with the bracket, thus tending to approach the upper ends of the arms 11 and, consequently, tending to compress the spring 14 which will resist and, therefore, reduce the shock and relieve the main spring 5. In case the main spring 5 breaks, the tension on the spring 14 may be made such that the spring will carry the load of the vehicle originally carried by the main spring 5.

From the above it will be seen that by varying the tension on the coil-spring 14 the same may be used as an auxiliary suspension, becoming operative when the main spring 5 breaks, or as a shock absorber operative all the time in conjunction with the main spring 5, so as to relieve the same from the extra stress that may be caused by the unevenness of the road.

Figure 4:
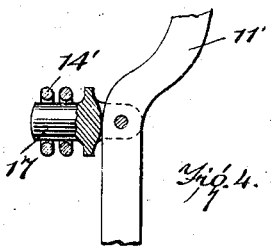

In the modified structure of the connection, as shown in Fig. 4, the ends of the spring 14' are engaged by a guide member 17 pivotally connected to the arm 11'. By means of this structure a self adjustment of the spring 14' is obtained.

Having thus described my invention, I claim as new and desire to secure by Letters Patent:

In combination,—a vehicle body; a bracket on the body; an axle for the body; a main spring between the bracket and the axle; a second bracket clamped to the axle; two oppositely disposed arms pivotally connected to said second bracket and extending from said second bracket to the body, the lower half of each of said arms having parts normally parallel to the plane passing through the bracket and the axle, the upper half of said arms diverging from said plane; substantially horizontally disposed links pivotally connecting said arms to the bracket;

turn-buckles in said links for varying their length; and a coil compression spring horizontally disposed between said arms positioned adjacent where the upper half of the arms begin to diverge from the lower half.

In testimony whereof I have signed my name to this specification in the presence of two subscribing witnesses.

FERDINAND J. KITOWSKI.

Witnesses:
AL. A. SEIFERT,
J. B. HEMISL.